United States Patent Office 3,538,070
Patented Nov. 3, 1970

3,538,070
PROTECTIVE GROUPS FOR THE HYDROXYL GROUP OF TYROSINE DURING PEPTIDE SYNTHESIS
Rolf Geiger, Frankfurt am Main, Georg Jäger, Raunheim am Main, and Walter Siedel, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed Feb. 27, 1968, Ser. No. 708,525
Claims priority, application Germany, Mar. 2, 1967, F 51,685; July 7, 1967, F 52,888
Int. Cl. C07c 101/00, 103/52, 125/04
U.S. Cl. 260—112.5      2 Claims

ABSTRACT OF THE DISCLOSURE

Peptide condensation reactions involving tyrosine-containing materials wherein the —OH group of the tyrosine is protected by an alkali-labile, acid- and hydrogenation-stable carbalkoxy, carbaralkoxy, or carbamyl (RNHCO—) group.

---

The present invention relates to a process for the manufacture of tyrosine-containing peptides, wherein a peptide containing at least one tyrosine moiety of the general Formula I

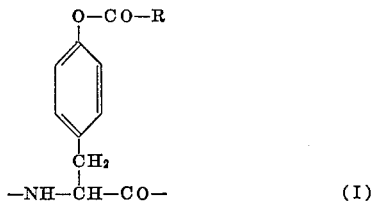

in which R stands for alkoxy derived from a primary or secondary alcohol, or aralkoxy containing at least 2 carbon atoms between the phenyl nucleus and the oxygen atom, or R means the $NHR_1$ group, $R_1$ standing for a hydrogen atom or for alkyl, aralkyl or aryl, is (a) treated with ammonia, an amine, a hydrazine or, if R does not stand for the group $NHR_1$, with a mono-acyl hydrazine, it being necessary that the amine or hydrazine derivative contains at least one NH group, or (b) the said tyrosine-containing peptide is subjected to alkaline hydrolysis.

For the synthesis of tyrosine-containing peptides, the hydroxy group of the tyrosine often remains unprotected or is converted into a benzyl ether, a tert.butyl ether or into the benzyloxycarbonyl compound [cf. E. Schröder and K. Lübke, "The Peptidies," New York and London, volume I (1965), pages 220–226]. If the OH-group is not protected, side-reactions often occur. In the synthesis of higher peptides using the mentioned protective groups, the sensitivity to acid or to catalytically activated hydrogen has often a disturbing effect on the benzyl derivatives.

The O-protective groups of the tyrosine used according to the process of the present invention do not have these disadvantages, because they cannot be split off, in an acid medium or by hydrogenation.

Thus, the use of the new O-protecting group permits the stepwise building up of tyrosine-containing peptides from the carboxyl end under maintenance of the O-protective group. With the hitherto used protective groups this was often very difficult because the separation of the N-protective group often also entailed separation of the O-protective group.

The substituted tyrosine derivatives, in which R represents an alkoxy or aralkoxy group and which are required for the preparation of the tyrosine peptides used according to the persent invention, may be obtained by the reaction of N-acyl-tyrosine with chloroformic acid alkyl esters in the presence of an acid-binding agent.

In the alkoxycarbonyl-tyrosines, there may be used as the alkyl group of the alkoxy group R in the general Formula I especially lower aliphatic alkyl radicals, for example methyl, ethyl, n-propyl, isopropyl, isobutyl groups or cycloaliphatic groups such as cyclohexyl groups. As aralkyl moiety of the aralkoxy groups, there may be used, for example, β-phenylethyl, γ-phenylpropyl, 4-phenylcyclohexyl or dibenzylmethyl groups.

The tyrosine derivatives, in which R stands for the group $NHR_1$, and which are required as starting compounds, may be obtained by methods known per se, by the reaction of N-acyltyrosine esters with N-carbonyl-sulfamic acid chloride [cf. German Patent 931,225, German Patent 931,467, Chemische Berichte 89, 1071 (1956), Chemische Berichte 96, 56 (1963)] with urea chloride [cf. Liebigs Annalen 244, 29 (1888)] or with alkyl- or aryl-isocyanates.

As alkyl groups $R_1$ of the group $NHR_1$ in the carbamyl compounds ($R=NHR_1$), there may be used, in particular, lower aliphatic alkyl groups, for example, methyl, ethyl, n-propyl, isopropyl, isobutyl groups or cycloaliphatic groups such as cyclohexyl groups. As aralkyl groups of the aralkyl-amido groups, there may be used, for example, β-phenylethyl and γ-phenylpropyl, 4-phenylcyclohexyl or dibenzylmethyl groups. As aryl groups R, especially the phenyl group and substituted pheny groups as well as the naphthyl group may be used.

The new protective groups may also be introduced into N-acyl-tyrosine esters and into tyrosine-containing peptides, if no other acyl-reactive groups are present.

These compounds may now be used according to the general methods of peptide chemistry for the manufacture of tyrosine-containing peptides. By direct reaction of the N-acyl-O-alkoxycarbonyltyrosines with, for example, amino acid esters or peptide esters or peptide amines in the presence of a condensing agent, such, as dicyclohexyl-carbodiimide (DCC), peptides are formed with prolongation of the chain at the carboxyl end of the tyrosine. By setting free the carboxgyl group, for example by catalytic hydrogenation of N-tert.butyloxycarbonyl-O-phenylcarbamyltyrosinebenzyl ester and subsequent condensation of the formed N-tert.butyloxycarbonyl-O-phenylcarbamyltyrosine with an amino acid ester or a peptide ester, peptides are also obtained with extension of the chain at the carboxyl end of the tyrosine.

By splitting off the N-acyl group, for example by catalytic hydrogenation of N-carbobenzoxy-O-ethoxycarbonyl-tyrosine methyl ester, the O-ethoxycarbonyltyrosine methyl ester is formed. This can be reacted, as well as an O-carbamyltyrosine ester obtained upon separation of the N-acyl group, with N-acyl-amino acids or -peptides to yield new peptides with prolongation of the chain at the amino end of the tyrosine.

It is also possible to use other condensation methods of peptide chemistry for example the, mixed anhydride method or the peptide synthesis via active esters. Active esters are accessible for example from N-acyl-O-alkoxycarbonyltyrosine and the activating component in most cases 4-nitrophenol 2,4,5-trichlorophenol pentachlorophenol or N-hydroxysuccinimide in the presence of dicyclohexylcarbodiimide.

As further moieties of the peptides containing the tyrosine derivatives of the general Formula I there may be used all amino acids in their L- or D-form present in naturally occurring peptides. Even the use of β-amino acids for example β-alanine or of other only synthetically or semisynthetically accessible amino acids for example α-methylalanine, α-methyl-3,4-dihydroxy-L-phenylalanine or β-chloroalanine, is possible. Further functional groups of the amino acids are suitably protected according to the methods commonly used in peptide chemistry (cf. E. Schroder and K. Lübke "The Peptides" New York and London 1965, volume I, especially pages 3–75).

The separation of the new O-protective groups succeeds according to the invention by treatment with nucleophilic reagents such as hydrazine and the alkyl, aryl and monoacyl derivatives thereof which still contain at least one N—H group, for example, methylhydrazine, phenylhydrazine, methyl- or tert.-butyloxycarbonylhydrazide, furthermore with ammonia, primary and secondary, preponderantly lower aliphatic amines, for example, methylamine, ethylamine, propylamine, isopropylamine, butylamine, isobutylamine, dimethylamine or dibutylamine. The separation succeeds also with the salts or hydrazines or amines or of ammonia with weak organic acids preferably acetic acid. Mono-acyl-hydrazines, however, are not suitable for the separation of the O-carbamyl-protective groups (R=NHR₁), because the carbamyl-protective groups are more difficult to separate than the alkoxycarbonyl protective groups.

The alkaline hydrolysis is effected with aqueous or alcoholic alkali metal hydroxide or alkaline earth metal hydroxide, for example sodium hydroxide solution, aqueous-methanolic barium hydroxide or lithium hydroxide, and with alkali metal alkoxides, for examples sodium methoxide in methanol. Even when treating the peptide with an alkali metal, for example sodium, potassium or calcium, in liquid ammonia, the new protective groups are split off simultaneously.

The splitting conditions depend on the reagent used and on the nature of the peptide. With hydrazine, the separation of the protective groups is in most cases completed in the case of alkoxycarbonyl-compounds already after 30 minutes and in the case of the carbamyl compounds mostly after a few hours, whereas ammonia and amines require longer reaction periods.

The alkoxycarbonyl-protective group is split off with 1 N-sodium hydroxide solution after 30–60 minutes; and carbamyl group requires a longer reaction period of about 1–2 hours even with 2 N-sodium hydroxide solution. The unsubstituted carbamyl-protective group is the most rapid to be removed.

Heating is in general not necessary, unless difficult solubility of the peptides in cold solvents makes it necessary.

As solvents, all solvents commonly employed in peptide chemistry may be used if they are stable towards the splitting reagents under the reaction conditions, for example, water, alcohols, dioxane, dimethylacetamide and pyridine, if desired also in admixture with one another.

The isolation of the peptides resulting from the separation of the protective groups may be effected, if these peptides are soluble in, for example, ethyl acetate, by distribution between ethyl acetate and weakly acidified water. If they are insoluble in solvents such as ethyl acetate, acetone or ether, the peptides are simply precipitated with the aid of one of these solvents, preferably acetone, alone or in admixture with ethyl acetate or ether, from its solution. It is of advantage previously to remove by distillation a part of the solvent in which the separation had been effected.

The products of the present invention may be used as medicaments or they may be used as intermediary products in the manufacture of other therapeutically valuable peptides.

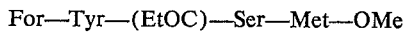

(Example (3b)) may be reacted, after separation of the protective groups, with BOC—Ser—N₃ to yield

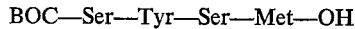

From this compound, there is obtained by condensation with H—Glu(OtBu)—His—Phe—Arg—Try—Gly—OH, the MSH-active decapeptide of the ACTH-sequence 1–10. This can again be reacted according to German Pat. 1,240,088 to yield the ACTH¹⁻²³-amide which, after separation of the protective groups and purification, has full ACTH-activity.

Furthermore, for example, the known heptapeptide

H—Ile—Glu(NH₂)—Asp(NH₂)—Cys(Bzl)—
        Pro—Leu—Gly—NH₂ from the oxytocin sequence may be reacted with

BOC—Tyr(PAC)—OTCP or with another actived tyrosine derivative of this series to form the corresponding octapeptide derivative and this may be further reacted, after separation of the N-protective group, with

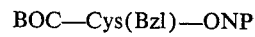

to yield the protected oxytocin derivative. The separation of the Bzl-protective groups with sodium in liquid ammonia, whereby according to the present invention the new protective groups are simultaneously removed, and the further reaction steps towards oxytocin are known.

By similar methods, known per se, the new tyrosine derivatives may be used for the synthesis of other peptides, for example insulin, glucagon, hypertensin, etc.

The following examples illustrate the invention, but they are not intended to limit it thereto: the abbreviaions used for denominating the individual amino acids and protective groups are those commonly used in peptide chemistry:

Z=carbobenzoxy
For=formyl
ONP=p-nitrophenyl
BOC=tert.-butyloxylcarbonyl
TCP=2,4,5-trichlorophenyl
Bzl=benzyl For the new O-protective groups of the tyrosine, the following abbreviations are introduced:

EtOC=ethoxycarbonyl
AC=carbamyl
i-BAC=iso-butylcarbamyl
PAC=phenylcarbamyl
NPAC=nitrophenylcarbamyl

EXAMPLE 1

(a) Z—Tyr—(EtOC)—OH.—31.5 g. (0.1 mol) of Z—Tyr—OH were dissolved in 150 ml. of 1 N-aOH. The solution was combined with 15 g. of sodium carbonate; then, 11 ml. (0.115 mol) of chloroformic acid ethyl ester were added dropwise, while stirring vigorously, at 10° C. at the most. After a short time, a thick precipitate was formed. The whole was diluted with 300 ml. of water and stirred for one hour at room temperature. The pH was then adjusted to 2 by means of semiconcentrated MCl and the precipitate that had separated was taken up in 300 ml. of ethyl acetate. The ethyl acetate solution was washed with 1 N-HCl and water and dried over sodium sulfate. After removal by distillation of the ethyl acetate, a crystalline residue remained behind which was recrystallized from 150 ml. of 60% methanol. Yield: 36.1 g. (93% of the theory). Melting point: 117–119° C.

Calc. for $C_{20}H_{21}NO_7$ (387.37) (percent): C, 62.1; H, 5.47; N, 3.61. Found (percent): C, 61.7; H, 5.5; N, 3.9.

In a manner analogous to that described in Example 1(a), there were prepared:

N-carbobenzoxy-O-methoxycarbonyl-L - tyrosine, melting point: 120–122° C.;
N-carbobenzoxy-O-isobutoxycarbonyl-L-tyrosine, melting point: 103–105° C.;
N-carbobenzoxy-O-isopropoxycarbonyl-L - tyrosine, melting point: 119–121.5° C;
N-tert.-butyloxycarbonyl-O-ethoxycarbonyl - L - tyrosine, melting point: 165–166° C.

(b) Z—Tyr—(EtOC)—ONP.—7.74 g. (20 mmols) of Z—Tyr—(EtOC)—OH and 3.34 g. (24 mmols) of 4-nitrophenol were dissolved in a mixture of 70 ml. of ethyl acetate and 30 ml. of dimethylformamide and combined, at 0° C., with 4.2 g. (20.4 mmols) of dicyclohexycarbodiimide. After standing for 15 hours at 5° C., the mixture was cooled to 0° C. and the urea that had formed was filtered off with suction; the filtrate was evaporated to dryness under reduced pressure. An oily residue remained which crystallized upon rubbing with isopropanol. The yield, after three recrystallizations from isopropanol, amounted to 6.28 g. (62% of the theory). Melting point: 111–112° C.

Calc. for $C_{26}H_{24}N_2O_9$ (508.5) (percent): C, 61.41; H, 4.76; N, 5.51. Found (percent): C, 61.5; H, 4.7; N, 6.2.

(c) Z—Tyr—(EtOC)—Phe—$OCH_3$.—1.08 g. (5 mmol) of H—Phe—$OCH_3$· HCl and 2.54 g. (5 mmol) of Z—Tyr—(EtOC—ONP were dissolved in 15 ml. of dimethylformamide and, after cooling to −5° C., combined with 0.69 ml. (5 mmols) of triethylamine. After standing for 60 hours at room temperature, the mixture was evaporated under reduced pressure, the solid residue was dissolved in ethyl acetate and washed 15 times with saturated sodium bicarbonate solution and one time each with 1 N-HCl and water. The solution was dried over sodium sulfate and evaporated under reduced pressure. The residue was triturated with ether and after standing for some time in ether it was filtered with suction and washed with ether. Yield: 2.40 g. (87.6% of the theory). Melting point: 176–176.5° C.

Calc. for $C_{30}H_{32}N_2O_8$ (548.60) (percent): C, 65.68; H, 5.88; N, 5.11. Found (perecent): C, 65.7; H, 5.9; N, 5.2.

The compound was also prepared by acylation of the tyrosine peptide:

4.76 g. (10 mmols) of Z—Tyr—Phe—$OCH_3$, prepared according to J. Amer. Chem. Soc. 83 (1961), page 723, were dissolved in 25 ml. of tetrahydrofuran and 60 ml. of chloroform; after addition of 1.67 ml. (12 mmols) of triethylamine, 1.09 ml. (12 mmols) of chloroformic acid ethyl ester was added dropwise, while striring, at 0° C. The solution was allowed to stand for 12 hours at room temperature. The solvent was then removed by distillation under reduced pressure and the residue was taken up in moist ethyl acetate. The ethyl acetate solution was washed consecutively with 2 N-HCl, 1 N-NaOH and water, dried over sodium sulfate and evaporated to dryness under reduced pressure. The residue was recrystallized from a mixture of methanol and water. Yield: 3.6 g. (66% of the theory). Melting point: 175—175.5° C.

(d) Z—Tyr—Phe—$N_2H_3$.—1.37 g. (2.5 mmols) of Z—Tyr—(EtOC)—Phe—$OCH_3$ was dissolved in 100 ml. of methanol and allowed to stand for 70 hours at room temperature with 0.95 ml. (15 mmols) of 80% hydrazine hydrate. The crystalline precipitate was filtered off with suction and washed with methanol. Yield: 0.97 g. (81.5% of the theory). For analysis, it was recrystallized from 500 ml. of 80% methanol. Yield: 0.79 g. (66.5% of the theory). Melting point: 241.5° C.

Calc. for $C_{26}H_{28}N_4O_5$ (476.54) (percent): C, 65.53; H, 5.92; N, 11.76. Found (percent): C, 65.9; H, 6.0; N, 11.6.

EXAMPLE 2

(a) Z—Tyr—(EtOC)—$OCH_3$.—6.60 g. (20 mmols) of Z—Tyr—$OCH_3$ were dissolved in 50 ml. of chloroform. After addition of 3.22 ml. (23 mmols) of triethylamine, 2.17 ml. (23 mmols) of chloroformic acid ethyl ester were added dropwise, while stirring at 0° C. After standing for 3 hours at room temperature, the mixture was washed twice with saturated sodium bicarbonate solution, 1N-HCl and water, dried over sodium sulfate and evaporated. Yield: 7.2 g. (90% of the theory); melting point: 94–95° C. After recrystallization from diisopropyl ether. 6.5 g. (81% of the theory) of substance were obtained. Melting point: 95–95.5° C.

Calc. for $C_{21}H_{23}NO_7$ (401.40) (percent): C, 62.83; H, 5.78; N, 3.49. Found (percent): C, 62.7; H, 5.7; N, 3.5.

(b) H—Tyr—(EtOC)—$OCH_3$· HCl.—4.01 g. (10 mmols) of Z—Tyr—(EtOC)—$OCH_3$ were dissolved in 100 ml. of methanol and, after addition of 2.09 ml. of 4.97 N-HCl (10.3 mmols), hydrogenated for 2 hours in the presence of palladium black. After removal of the catalyst by filtration, the filtrate was evaporated to dryness under reduced pressure and the crystalline mass that remained was triturated with ether and hot ethyl acetate and filtered with suction. Yield. 1.9 g. (62% of the theory). Melting point: 162–163° C.

Calc. for $C_{13}H_{18}ClNO_5$ (303.75) (percent): C, 51.40; H, 5.97; N, 4.61; Cl, 11.67. Found (percent): C, 51.8; H, 6.0; N, 4.9; Cl, 12.0.

(c) Z—Phe—Tyr — (EtOC) — $OCH_3$. — 1.49 g. (5 mmols) of Z—Phe—OH were dissolved in 15 ml. of tetrahydrofuran. After addition of 0.7 ml. (5 mmols) of triethylamine, 0.48 ml. (5 mmols) of chloroformic acid ethyl ester were added dropwise, while stirring, at −10° C. The whole was stirred for 5 minutes at −5° C. and combined with the solution of 1.52 g. (5 mmols) of

H—Tyr·(EtOC)—$OCH_3$·HCl and 0.7 ml. of triethylamine in 20 ml. of dimethylacetamide, which had been previously cooled to −5° C. The temperature of the batch was allowed to rise slowly to room temperature and then the mixture was stirred for 2 hours at this temperature. The solvents were then removed by distillation under reduced pressure, the residue was taken up in ethyl acetate and the ethyl acetate solution was washed thrice with saturated sodium bicarbonate solution. 1 N-HCl and water, dried over sodium sulfate and evaporated under reduced pressure. 2.3 g. (84% of the theory) of substance were obtained. Melting point 163–166° C. After recrystallization from a mixture of acetone and water, 1.88 g. (69% of the theory) of substance were obtained. Melting point: 170.5–171.5° C.

Calcd. for $C_{30}H_{32}N_2O_8$ (548.60) (percent): C, 65.68; H, 5.88; N, 5.11. Found (percent): C, 65.7; H, 5.9; N, 5.2.

(d) Z—Phe—Tyr — OH. — 2.75 g. (5 mmols) of Z—Phe—Tyr—(EtOC)—$OCH_3$ were dissolved in 40 ml. of dioxane and stirred for 2 hours at room temperature with 15 ml. of 1 N-NaOH. The whole was diluted with 250 ml. of water and by adding 15 ml. of 1 N-HCl a semisolid precipitate was separated which was dissolved in ethyl acetate and extracted from the ethyl acetate solution by means of a sodium bicarbonate solution. Upon addition of 1 N-HCl, a crystalline precipitate separated which was dried under reduced pressure over $P_2O_5$. The compound was found to melt at 181.5–183° C. and was identical with an authentic sample prepared according to Liebigs Annalen der Chemie, 652 (1962), page 76.

EXAMPLE 3

(a) For—Tyr—(EtOC)—OH.—20.9 g. of

For—Tyr—OH (0.1 mol) were dissolved in 150 ml. of 1 N-NaOH. 15 g. of sodium carbonate were added and then 11.0 ml. (0.115 mol) of chloroformic acid ethyl ester were added dropwise, while stirring vigorously, at 10° C. at the most. The whole was stirred for 2 hours at room temperature and by adding 2 N-HCl a white crystalline precipitate was separated. The crystals were dissolved in ethyl acetate, the filtrate was extracted twice with ethyl acetate, the combined ethyl acetate solutions were washed with 1 N-HCl and water, dried over sodium sulfate and evaporated under reduced pressure. A crystalline residue remained which was recrystallized from 25% methanol. Yield: 23.0 g. (81.5% of the theory). Melting point 172–173° C.

Calcd. for $C_{13}H_{15}NO_6$ (281.26) (percent): C, 55.55; H, 5.38; N, 4.94. Found (percent): C, 55.6; H, 5.3; N, 5.1.

(b) For—Tyr—(EtOC)—Ser—Met—$OCH_3$.— 7.0 g. (20 mmols) of BOC—Ser—Met—$OCH_3$, prepared according to German Specification 1,212,981 laid open to public inspection were dissolved in 54 ml. of 0.55 N-HCl in methanol. The solution was allowed to stand for one hour at room temperature, the solvent was removed by distillation under reduced pressure and the oily residue was digested several times with anhydrous ether. The excess ether was removed under reduced pressure. The residue was dissolved in 40 ml. of a mixture of dimethylacetamide and acetonitrile 1:1, 5.62 g. of For—Tyr—(EtOC)—OH (20 mmols) and 2.8 ml. (20 mmols) of triethylamine were added and the whole was combined at −150° C. with 4.3 g. (21 mmols) of DCC dissolved in a small amount of acetonitrile. The temperature of the mixture was then allowed to rise slowly to room temperature and, after standing overnight, the urea that had precipitated (4.5 g.) was removed by filtration with suction. The filtrate was evaporated to dryness under reduced pressure, the residue was taken up in moist ethyl acetate, the ethyl acetate solution was washed, after filtration, with 1 N-HCl, saturated sodium bicarbonate solution and water (the aqueous phase each time containing 10% of NaCl) and evaporated to dryness with addition of toluene. The residue was recrystallized from ethyl acetate, during which operation a small amount of undissolved matter was removed by filtration. Yield: 7.6 g. (74% of the theory). Melting point: 164–166° C.

Calcd. for $C_{22}H_{31}N_3O_9S$ (513.56) (percent): C, 51.4; H, 6.09; N, 8.18. Found (percent): C, 51.3; H, 6.3; N, 8.3.

(c) For—Tyr—Ser—Met—$N_2H_3$.—1.54 g. 3 mmols) of For—Tyr—(EtOC)—Ser—Met—$OCH_3$ were dissolved in 20 ml. of methanol. 1.1 ml. (18 mmols) of 80% hydrazine hydrate were added and the whole was allowed to stand for 12 hours at room temperature. The precipitate (1.22 g.) was separated by filtration with suction and recrystallized from 60 ml. of 80% methanol. Yield: 0.98 g. (74% of the theory). Melting point: 208–210° C.

Calcd. for $C_{18}H_{28}N_5O_6S$ (441.50) (percent): C, 48.95; H, 6.16; N, 15.82. Found (percent): C. 48.6; H, 6.3; N, 16.0.

EXAMPLE 4

(a) Z—Tyr—(EtOC)—Gly—$NH_2$.—7.7 g. of

Z—Tyr—(EtOC)—OH (20 mmols) and 2.8 ml. of triethylamine were dissolved in 40 ml. of tetrahydrofuran. 2.6 ml. of chloroformic acid isobutyl ester were added dropwise, while stirring, at −5° C., and the whole was stirred for 10 minutes at −5° C. and then combined with a solution of 3.73 g. of H—Gly—$NH_2$·HCl (30 mmols) and 4.0 ml. (28.8 mmols) of triethylamine in a small amount of water which had been cooled to 0° C. The whole was stirred for one hour at room temperature, the solvent was removed by distillation under reduced pressure, the residue was taken up in moist ethyl acetate and the ethyl acetate solution was washed with 1 N-HCl, saturated sodium bicarbonate solution and water, the ethyl acetate was removed by evaporation and the residue was crystallized from 70% ethanol. 8.08 g. (91% of theory) of jelly-like crystals melting at 154–157° C. (sintering at 150° C.) were obtained. For analysis, the compound was recrystallized from diethyl-ketone. Melting point: 157–159° C.

Calcd. for $C_{22}H_{25}N_3O_7$ (443.44) (percent): C, 59.6; H, 5.68; N, 9.48. Found (percent): C, 59.4; H, 5.6; N, 9.5.

(b) Z — Tyr — Gly — $NH_2$ .— 4.43 g. (10 mmols) of Z—Tyr—(EtOC)—Gly—$NH_2$ were stored for 12 hours at room temperature in 40 ml. of 2 N-$NH_3$ in methanol. The whole was evaporated to dryness and the residue was recrystallized from a mixture of methanol and water. Yield: 3.42 g. (92% of the theory). Melting point 114–116° C. The compound was identical with the amide prepared from the ethyl ester [Chem. Ber. 93 (1960), page 2387].

EXAMPLE 5

Separation of the N-BOC protective group under maintenance of the new O-protective group.—50 ml. of saturated HCl/ethyl acetate were poured over 3.53 g. (10 mmols) of BOC—Tyr—(EtOC)—OH. After 30 minutes, the precipitate was separated by filtration with suction and washed with ethyl acetate and ether. Yield: 2.30 g. (79.3% of the theory). Melting point: 219–220° C. (decomposition).

Calc. for $C_{12}H_{16}ClNO_5$ (289.72) (percent): C, 49.75; H, 5.57; N, 4.84; Cl, 12.24. Found (percent): C, 49.9; H, 5.6; N, 5.5; Cl, 12.3.

By dissolving the hydrochloride in 10 ml. of hot water and addition of 1 ml. of pyridine, the O-ethloxycarbonyl-L-tyrosine could be separated and was then filtered off with suction and recrystallized from water.

EXAMPLE 6

(a) Z—Tyr—(AC)—$OCH_3$.—(α) 3.29 g. (10 mmols) of Z—Tyr—$OCH_3$ were dissolved in 4 ml. of acetonitrile and combined, while cooling, with 0.89 ml. (10 mmols) of N-carbonyl-sulfamic acid chloride. After standing for 4 hours at room temperature, the mixture was poured into 500 ml. of water, heated for 15 minutes to 70° C. and then cooled to 5° C. The crystals, which had been filtered off with suction, were washed with water until they were free from acid, dried and recrystallized twice from a mixture of chloroform and ether. Yield: 1.75 g. (47% of the theory), melting point: 131.5–132° C.

Calc. for $C_{19}H_{20}N_2O_6$ (372.39) (percent): C, 61.28; H, 5.41; N, 7.52. Found (percent): C, 61.2; H, 5.5; N, 7.4.

(β) 3.29 g. (10 mmols) of Z—Tyr—$OCH_3$ were dissolved in 10 ml. of methylene chloride, 0.87 g. (11 mmols) of urea chloride was added, and the solution was allowed to stand for 4 hours at room temperature. After evaporation to dryness, the solid residue was triturated with water, filtered off with suction and washed wtih water until neutrality. The dried crude product was recrystallized thrice from a mixture of chloroform and ether. Yield: 1.82 g. (49% of the theory). Melting point: 131.5° C.

(b) H—Tyr—(AC)—$OCH_3$·HCl.—1.86 g. (5 mmols) of Z—Tyr—(AC)—$OCH_3$ were dissolved in 30 ml. of methanol and, after addition of 0.8 ml. (5.8 mmols) of 7.3 N-methanolic HCl, hydrogenated for 2 hours in the presence of palladium black. The precipitate that had formed was dissolved by the addition of dimethylformamide and separated from the catalyst by filtration. The filtrate was freed from solvent under reduced pressure at room temperature. Yield: 1.25 g. (91% of the theory); melting point: 214.5–215.5° C. (decomposition).

Calc. for $C_{11}H_{15}N_2O_4Cl$ (274.71) (percent): C, 48.09; H, 5.50; N, 10.20; Cl, 12.91. Found (percent): C, 47.6; H, 5.5; N, 10.0; Cl, 13.6.

(c) Z—Phe—Tyr—(AC)—$OCH_3$.—A mixture of 0.82 g. (3 mmols) of H—Tyr—(AC)—$OCH_3$·HCl and 1.43 g. (3 mmols) of Z—Phe—OTCP in 50 ml. of dimethylformamide was combined, at −5° C., with 0.43 ml. (3 mmols) of triethylamine and stored for 65 hours at room temperature. The solution was then evaporated in the cold and in a high vacuum, the solid residue was dissolved in a large amount of chloroform and the solution was washed five times with sodium bicarbonate solution, twice with 1 N-hydrochloric acid and twice with water. After drying over sodium sulfate, the solvent was removed by distillation under reduced pressure and the crystalline residue was triturated with ether, allowed to stand for some hours at 5° C. and filtered off with suction. Yield: 1.03 g. (66% of the theory). Melting point 187–188° C. For analysis, a sample was recrystallized from methanol. It showed no increase of the melting point.

Calc. for $C_{28}H_{29}N_3O_7$ (519.56) (percent): C, 64.73; H, 5.63; N, 8.09. Found (percent): C, 64.5; H, 5.7; N, 8.3.

(d) Z—Phe—Tyr—NHNH$_2$.—0.52 g. (1 mmol) of Z—Phe—Tyr—(AC)—OCH$_3$ were dissolved in 4 ml. of dimethylacetamide and allowed to stand for 18 hours, at room temperature, with 0.32 ml. (5 mmols) of 80% hydrazine hydrate. The solid residue obtained upon evaporation of the solvent under reduced pressure at room temperature was triturated with methanol and filtered off with suction. The crude product melting at 210–212° C. (0.37 g.=78% of the theory) was recrystallized from methanol. Yield: 0.28 g. (59% of the theory). Melting point: 224.5–225° C. (decomposition).

Calc. for $C_{26}H_{28}N_4O_5$ (476.54) (percent): C, 65.53; H, 5.92; N, 11.76. Found (percent): C, 65.2; H, 6.0; N, 12.4.

EXAMPLE 7

(a) Z—Tyr—(i—BAC)—OCH$_3$.—3.29 g. (10 mmols) of Z—Tyr—OCH$_3$ were dissolved in 10 ml. of i-butyl-isocyanate and heated for 2 hours to 60° C. After cooling to 0° C., the whole was triturated successively thrice with ligroin and decanted. The crystals were washed with ligroin and recrystallized from a mixture of chloroform and ligroin. Yield: 3.28 g. (76% of the theory). Melting point: 108.5° C.

Calc. for $C_{23}H_{28}N_2O_6$ (428.49) (percent): C, 64.47; H, 6.59; N, 6.54. Found (percent): C, 64.2; H, 6.6; N, 6.7.

(b) H—Tyr—(i—BAC)—OCH$_3$·HBr.—4.28 g. (10 mmols) of Z—Tyr—(i—BAC)—OCH$_3$ were dissolved in 25 ml. of a mixture of HBr and glacial acetic acid and allowed to stand for one hour at room temperature. After the whole was poured into 500 ml. of absolute ether and stored for 30 minutes at 5° C., the crystals that had formed were separated by filtration with suction, triturated again in absolute ether, filtered off with suction and washed with ether. Yield: 3.28 g. (87.5% of the theory). Melting point: 210.5–211.5° C. (decomposition).

Calc. for $C_{15}H_{23}N_2O_4Br$ (375.28) (percent): C, 48.01; H, 6.18; N, 7.46; Br, 21.29. Found (percent): C, 48.1; H, 6.0; N, 7.0; Br, 21.3.

(c) Z—Phe—Tyr—(i—BAC)—OCH$_3$.—0.75 g. (2 mmols) of H—Tyr—(i—BAC)—OCH$_3$·HBr and 0.95 g. (2 mmols) of Z—Phe—OTCP were dissolved in 10 ml. of dimethylformamide and, after cooling to —5° C., combined with 0.28 ml. (2 mmols) of triethylamine. After standing for 60 hours at room temperature, the mixture was evaporated under reduced pressure, the residue was dissolved in chloroform and worked up as described in Example 1c). Yield: 0.98 g. (85% of the theory). Melting point: 196–198° C.

Calc. for $C_{32}H_{37}N_3O_7$ (575.68) (percent): C, 66.77; H, 6.48; N, 7.30. Found (percent): C, 66.9; H, 6.5; N, 7.6.

(d) Z—Phe—Tyr—OH.—0.58 g. (1 mmol) of Z—Phe—Tyr—(i—BAC)—OCH$_3$ was dissolved in 7 ml. of dimethyl-acetamide and 5 ml. of dioxane and, after addition of 1.5 ml. (3 mmols) of 2 N sodium hydroxide solution, the whole was stirred for 2 hours at room temperature. The solution was diluted with 100 ml. of water, combined with 1.75 ml. of 2 N hydrochloric acid, the precipitate that had separated was taken up in ethyl acetate and extracted with three portions of sodium bicarbonate solution. Upon addition of 2 N hydrochloric acid, the crystalline Z-peptide precipitated which was washed with water and dried. Yield: 0.36 g. (78% of the theory). Melting point: 187–188° C. A sample thereof was recrystallized for analysis from a mixture of ethyl acetate and petroleum ether, whereupon the melting point was found to have risen to 189–189.5° C. Melting point literature: 184–185° C. [Liebigs Ann. Chem. 652, 79 (1962)].

Calcd. for $C_{26}H_{26}N_2O_6$ (462.51) (percent): C, 67.52; H, 5.67; N, 6.06. Found (percent): C, 67.7; H, 5.8; N, 6.0.

EXAMPLE 8

Z—Phe—Tyr—NHHN$_2$.—1.15 g. (2 mmols) of Z—Phe—Tyr—(i—BAC)—OCH$_3$ [prepared according to Example 2(c)] were reacted as described in Example 1(d) for 36 hours, at room temperature, in 8 ml. of dimethylacetamide with 0.64 ml. (10 mmols) of 80% hydrazine hydrate. Yield: 0.84 g. (88% of the theory). Melting point: 224–225° C. The hydrazide showed the same properties as the product obtained according to Example 1(d).

Calc. for $C_{26}H_{28}N_4O_5$ (476.54) (percent): C, 65.53; H, 5.92; N, 11.76. Found (percent): C, 65.2; H, 5.9; N, 12.0.

EXAMPLE 9

(a) Z—Tyr—(PAC)—OCH$_3$.—3.29 g. (10 mmols) of Z—Tyr—OCH$_3$ were dissolved in 20 ml. of dimethylformamide. After cooling to 0° C., 1.31 g. (11 mmols) of phenyisocyanate were added and the whole was allowed to stand for 50 hours. It was then evaporated in a high vacuum. The residue crystallized upon trituration with ligroin. The crystals were filtered off with suction and triturated with absolute ethanol, allowed to stand for 12 hours, filtered off with suction and washed with ethanol. Yield: 3.22 g. (72% of the theory). Melting point: 140–141° C.

Calc. for $C_{25}H_{24}N_2O_6$ (448.49) (percent): C, 66.95; H, 5.39; N, 6.25. Found (percent): C, 67.0; H, 5.0; N, 6.0.

(b) H—Tyr—(PAC)—OCH$_3$·HBr.—4.48 g. (10 mmols) of Z—Tyr—(PAC)—OCH$_3$ were reacted with 10 ml. of a mixture of HBr and glacial acetic acid for one hour, at room temperature. After addition of 100 ml. of absolute ether and short standing, the whole was suction-filtered and washed with ether. The crude product was triturated in hot ethyl acetate. Yield: 3.64 g. (92% of the theory). Melting point: 205.5° C. (decomposition).

Calc. for $C_{17}H_{19}N_2O_4Br$ (395.26) (percent): C, 51.66; H, 4.85; N, 7.09; Br, 20.22. Found (percent): C, 51.5; H, 5.0; N, 7.0; Br, 20.4.

(c) Z—Phe—Tyr—(PAC)—OCH$_3$.—($\alpha$) 1.49 g. (5 mmols) of Z—Phe—OH were dissolved in 20 ml. of tetrahydrofuran. After the addition of 0.7 ml. (5 mmols) of triethylamine, 0.48 ml. (5 mmols) of chloroformic acid ethyl ester were added dropwise, at —10° C., while stirring. The precipitate that separated was dissolved by the addition of 20 ml. of dimethylformamide and 50 ml. of chloroform. The whole was stirred for 5 minutes at —5° C. and then combined with a solution of 1.98 g. (5 mmols) of H—Tyr—(PAC)—OCH$_3$·HBr and 0.7 ml. of triethylamine in 40 ml. of dimethylacetamide and 60 ml. of chloroform, which had been cooled to —5° C. The temperature of the batch was allowed to rise slowly to room temperature and the mixture was stirred for one hour. After removal of the solvent by distillation under reduced pressure, the residue was taken up in 2.5 liters of chloroform and the solution was washed with sodium bicarbonate solution, 1 N-hydrochloric acid and water, dried over sodium sulfate and evaporated under reduced pressure. The crude product (2.81 g.=95% of the theory) melting at 182.5–185° C. was recrystallized from a mixture of chloroform and petroleum ether. Yield: 1.85 g. (62% of the theory). Melting point 193–195° C.

Calc. for $C_{34}H_{33}N_3O_7$ (595.67) (percent): C, 68.56;

H, 5.58; N, 7.05. Found (percent): C, 67.9; H, 5.5; N, 6.8.

(β) 3.95 g. (10 mmols) of H—Tyr—(PAC)—OCH$_3$·HBr and 4.77 g. (10 mmols) of Z—Phe—OTCP were reacted in 30 ml. of dimethylformamide according to Example 1(c). Yield: 5.20 g. (87% of the theory). Melting point: 195–196° C.

(γ) Introduction of the PAC-protective group into Z—Phe—Tyr—OCH$_3$.—2.39 g. (5 mmols) of Z—Phe—Tyr—OCH$_3$ [prepared according to the mixed anhydride method, melting point 143–144° C. (melting point in literature: 137–138° C., Rec. Trav. Chim. Pays Bas 78, (1959), page 487). Calc. for C$_{27}$H$_{28}$N$_2$O$_6$ (476.54) (percent): C, 68.05; H, 5.93; N, 5.88. Found (percent): C, 68.3; H, 6.1; N, 5.8 were dissolved in 20 ml. of absolute dimethylformamide, the solution was cooled to −5° C. and combined with 0.66 g. (5.5 mmols) of phenyl isocyanate. After standing for 65 hours at room temperature, the solution was evaporated to dryness in a high vacuum, the solid residue was triturated with ligroin and filtered off with suction. The crude product was recrystallized twice from a mixture of chloroform, dimethylacetamide and petrol ether. Yield: 166 g. (56% of the theory). Melting point 195–196.5° C.

(d) Z—Phe—Tyr—OH.—1.19 g. (2 mmols) of Z—Phe—Tyr—(PAC)—OCH$_3$ were hydrolyzed in 14 ml. of dimethylacetamide and 10 ml. of dioxane with 3 ml. (6 mmols) of 2 N sodium hydroxide solution as described in Example 2(d). Yield: 0.72 g. (78% of the theory). Melting point: 185–187° C. Both Z-peptides were identical.

EXAMPLE 10

Z—Phe—Tyr—NHNH$_2$.—The reaction of 0.60 g. (1 mmol) of Z—Phe—Tyr—(PAC)—OCH$_3$ [prepared according to Example 4(c)] with 0.32 ml. (5 mmols) of 80% hydrazine hydrate in 4 ml. of dimethylacetamide was effected as described in Example 1(d). The reaction time was 38 hours. Yield: 0.34 g. (71% of the theory). Melting point: 224–224.5° C.

The two hydrazides had the same properties.

EXAMPLE 11

(a) BOC—Tyr—OBzl.—60 g. (0.22 mol) of

H—Tyr—OBzl were stirred for 2 days, at room temperature, with BOC-azide in pyridine. Yield: 62.5 g. (77% of the theory). Melting point: 126–127° C.

Calc. for C$_{21}$H$_{25}$NO$_5$ (371.24) (percent): C, 67.94; H, 6.79; N, 3.77. Found (percent): C, 68.0; H, 6.8; N, 3.7.

(b) BOC—Tyr—(PAC)—OBzl.—7.42 g. (20 mmols) of BOC—Tyr—OBzl were dissolved in 50 ml. of absolute dimethylformamide and, after cooling to 0° C., combined with 2.62 g. (22 mols) of phenylisocyanate. After standing for 50 hours at room temperature, the solvent was removed by distillation in a high vacuum and the oily residue was triturated twice with ligroin, whereby partial crystallization took place. Upon dissolution in cold methanol and precipitation with water, the product crystallized thoroughly and was then recrystallized from a mixture of hot ethanol and water. Yield: 7.10 g. (72% of the theory). Melting point: 108–108.5° C.

Calc. for C$_{28}$H$_{30}$N$_2$O$_6$ (490.57) (percent): C, 68.55; H, 6.16; N, 5.71. Found (percent): C, 68.5; H, 6.3; N, 5.8.

(c) BOC—Tyr—(PAC)—OH.—3.8 g. (7.75 mmols) of BOC—Tyr—(PAC)—OBzl were dissolved in 120 ml. of methanol and hydrogenated for 30 minutes in the presence of palladium black. The catalyst was removed by filtration and the filtrate was evaporated under reduced pressure. The residue was dissolved in ethyl acetate and the product was precipitated by adding petroleum ether. Yield: 2.6 g. (84% of the theory). Melting point: 125–130° C.

Calc. for C$_{21}$H$_{24}$N$_2$O$_6$ (400.44) (percent): C, 62.99; H, 6.04; N, 7.00. Found (percent): C, 63.1; H, 6.2; N, 7.2.

(d) BOC—Tyr—(PAC)—OTCP.—2.00 g. (5 mmols) of BOC—Tyr—(PAC)—OH and 1.19 g. (6 mmols) of 2,4,5-trichlorophenol were dissolved in 45 ml. of ethyl acetate and combined, at 0° C., with 1.05 g. (5.1 mmols) of dicyclohexyl-carbodiimide. After standing for 16 hours at 5° C., the urea was removed by filtration with suction, the filtrate was evaporated to dryness under reduced pressure and the crystalline residue was recrystallized from isopropanol. Yield: 0.94 g. (32% of the theory). Melting point: 162° C.

Calc. for C$_{27}$H$_{25}$N$_2$O$_6$Cl$_3$ (579.89) (percent): C, 55.93; H, 4.35; N, 4.83; Cl, 18.34. Found (percent): C, 56.0; H, 4.5; N, 4.8; Cl 18.1.

(e) BOC—Tyr—(PAC)—Phe—OCH$_3$.—0.58 g. (1 mmol) of BOC—Tyr—(PAC)—OTCP and 0.22 g. (1 mmol) of H—Phe—OCH$_3$·HCl were dissolved in 3 ml. of dimethylformamide and combined, at −5° C., with 0.14 ml. (1 mmol) of triethylamine. After standing for 30 hours at room temperature, the mixture was evaporated under reduced pressure, the semi-solid residue was dissolved in a mixture of chloroform and ethyl acetate and washed, dried and evaporated as described in Example 1(c). The residue was triturated with a mixture of ether and petroleum ether, filtered off with suction and washed with petroleum ether. Yield: 0.39 g. (70% of the theory). Melting point: 152–153° C. (sintering from 115° C.).

Calc. for C$_{31}$H$_{35}$N$_3$O$_7$ (561.64) (percent): C, 66.30; H, 6.28; N, 7.48. Found (percent): C, 66.5; H, 6.3; N, 7.5.

(f) BOC—Tyr—Phe—NHNH$_2$.—

BOC—Tyr—(PAC)—Phe—OCH$_3$ was subjected to hydrazinolysis as described in Example 1(d). Yield: 60% of the theory. Melting point: 208° C.

EXAMPLE 12

Introduction and separation of the NPAC group (a) Z—Tyr—(NPAC)—OCH$_3$.—6.6 g. (20 mmols) of Z—Tyr—OCH$_3$ were dissolved in 25 ml. of dimethylformamide and cooled to −5° C. To this solution, there was added a solution of 3.6 g. (22 mmols) of p-nitrophenylisocyanate in 60 ml. of dimethylformamide, which had been cooled to −5° C., and the total solution was allowed to stand for 24 hours at room temperature. The urea that precipitated was filtered off with suction and the filtrate was evaporated in a high vacuum. The residue was triturated twice with ligroin and decanted. The crude product was dissolved in acetone, the resulting solution was poured onto a column filled with neutral aluminum oxide and elution was effected with a mixture of n-hexane, ethyl acetate and glacial acetic acid (20:10:1). The solution containing the first appearing substance was evaporated under reduced pressure and the solid residue was recrystallized from hot methanol. Yield: 3.22 g. (33% of the theory). Melting point: 179–180° C.

Calc. for C$_{25}$H$_{23}$N$_3$O$_8$ (493.49) (percent): C, 60.85; H, 4.70; N, 8.52. Found (percent): C, 60.6; H, 4.7; N, 8.6.

(b) Z—Tyr—NHNH$_2$.—0.49 g. (1 mmol) of

Z—Tyr—(NPAC)—OCH$_3$ was dissolved in 3 ml. of dimethylacetamide and allowed to react for 22 hours, at room temperature, with 0.32 ml. (5 mmols) of 80% hydrazine hydrate. After evaporation, the residue was triturated with methanol and filtered off with suction. The crude hydrazide was recrystallized from methanol. Yield: 0.21 g. (64% of the theory). Melting point: 220.5–221° C. (decomposition). The substance was identical with Z—Tyr—NHNH$_2$.

We claim:

1. In a process for the synthesis of peptides built up from α-amino acids by condensing, in a series of standard peptide condensation reactions, members of the group consisting of α-amino acids and peptides built up from α-amino acids, wherein at least one of said members is or contains tyrosine and wherein the hydroxy group of said tyrosine and nonreacting amino and carboxy groups of said members are protected during said peptide condensation reactions, the improvement wherein said hydroxy group of tyrosine is protected by a lower alkoxycarbonyl group.

2. A process as in claim 1 wherein said protective lower alkoxycarbonyl group is removed, after said peptide condensation reactions, by treatment with a dilute solution of an alkali metal hydroxide, an alkaline earth metal hydroxide, or an alkali metal lower alkoxide.

References Cited

Guttmann et al.: Helv. Chim. Acta 49, 83–90 (1966).

Muhlrad et al.: Acta Biochim. Biophys. Acad. Sci. Hung. 2, 19–29 (1967).

Schroder et al.: The Peptides, vol. I, Academic Press, New York (1965), pp. 222–233.

LEWIS GOTTS, Primary Examiner

M. M. KASSENOFF, Assistant Examiner

U.S. Cl. X.R.

260—463, 471, 472